(No Model.)

W. EDDY.
POTATO DIGGER.

No. 318,236. Patented May 19, 1885.

WITNESSES:
Harrison B Brown
Amos W Hart

INVENTOR:
Walden Eddy
BY Munn & Co
ATTORNEYS.

UNITED STATES PATENT OFFICE.

WALDEN EDDY, OF GREENWICH, NEW YORK.

POTATO-DIGGER.

SPECIFICATION forming part of Letters Patent No. 318,236, dated May 19, 1885.

Application filed January 9, 1885. (No model.)

*To all whom it may concern:*

Be it known that I, WALDEN EDDY, a citizen of the United States, residing in Greenwich, in the county of Washington and State of New York, have invented a new and useful Improvement in Potato-Diggers, of which the following is a specification.

My invention is an improvement in the class of wheelless potato-diggers having a concave plow or scoop that is provided with rigid handles and pivoted to the vertical frame to which the team is attached.

My improvement relates to the construction and combination of parts whereby a considerable economy in manufacture is attained, and whereby the plow or scoop is adapted to be easily tilted or oscillated vertically by a corresponding movement of the rearwardly-projecting handles, reference being had to the accompanying drawings, in which—

Figure 1:
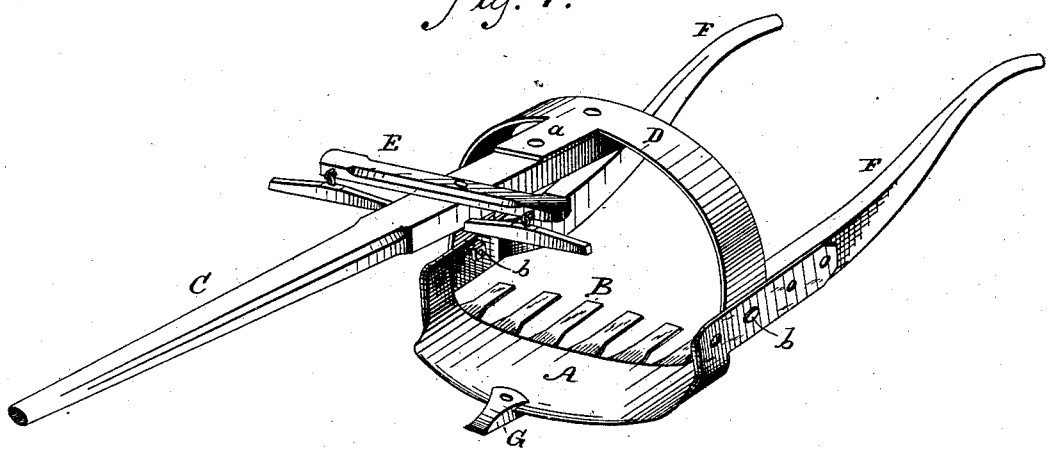
Figure 2:
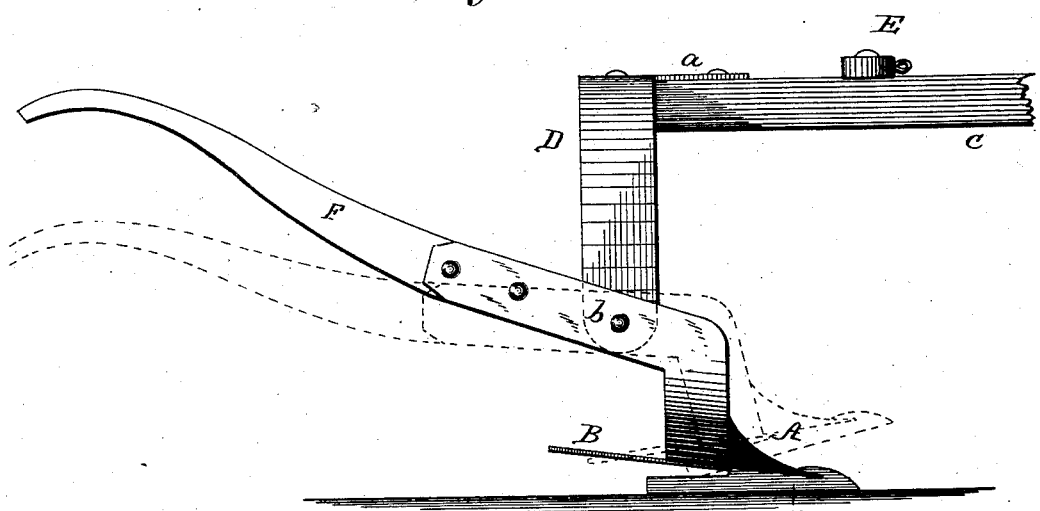

Figure 1 is a perspective view, and Fig. 2 a side view, of my invention.

Similar letters refer to similar parts throughout the several views.

The plow or scoop A is constructed of a thin narrow plate, preferably of steel, having a convex front edge, and curved or concaved in the direction of its length. To its rear edge a number of arms or fingers, B, are rigidly attached to serve as a riddle for separating potatoes from such portion of soil as may adhere to them. The tongue C is rigidly bolted to the top and center of the metal semicircular frame D, and to it is pivoted a double-tree, E. Said frame is constructed of a single narrow wrought-metal plate of requisite thickness, and provided with a forward projection or arm, *a*, which extends along and is bolted to the tongue. To this frame are pivoted at *b* elbow-shaped arms, that are securely bolted or riveted to the upturned ends of the plow A. The pivotal points *b* are, however, behind the plow, and the handles F are attached to the extremities of said arms and project horizontally rearward, as shown. It will be seen that as the implement is drawn forward the plow A will slice the soil beneath the hills of potatoes and raise them from their bed, together with adhering soil, which latter will be wholly or mainly separated from them in passing rearward over the fingers B; but since the surface of all fields is undulating or varies more or less from a horizontal plane, and the potato-hills also vary more or less in height, it is obvious that the transverse inclination of the plow to such plane or to its direction of motion must be changed correspondingly, in order to prevent it from entering the ground too deep or too shallow, which would result in undue increase of draft on the team on the one hand and cutting through the center of the potato-hills on the other. Therefore the plow A must be oscillated on the pivots *b*—that is to say, inclined upward or downward, according to the degree of surface undulation at different points along the row of potatoes. This operation is effected with ease and certainty by aid of the piece G, which is attached to the front edge and under side of the plow A, and serves as a fulcrum for the latter, whereby it is practically converted into a lever of the first class—that is to say, the plow is rocked on the piece G as a pivotal center, its point being raised or lowered more or less, as required, and this movement is easily effected by the plowman pressing downward or lifting on the handles F. Dotted lines, Fig. 2, indicate this movement of the plow. In addition to this important function of the piece G, it serves as a shoe or friction-runner for the plow in passing over grass or other land to and from the potato-field.

My potato-digger, constructed as above indicated, combines the very important qualities of great strength and lightness with ease of management or manipulation in use.

Having thus described my invention, what I desire to secure by Letters Patent is—

1. The combination, with the concave plate constituting the plow, the semicircular tongue-frame to which it is pivoted, and rigid rearwardly-projecting handles, of the fulcrum-piece G, which is secured to and beneath said plow and projects downward therefrom, as shown and described, to operate as specified.

2. The frame D, formed of the narrow semicircular wrought-metal plate having the forward projection, *a*, in combination with the tongue, which is bolted beneath, and the plow A, pivoted to the lower ends of said frame, and also constructed of a thin curved plate, as shown and described.

WALDEN EDDY.

Witnesses:
JESSE MIDDLETON,
SOLON C. KEMON,
AMOS W. HART.